(12) United States Patent
Koshita et al.

(10) Patent No.: US 6,654,259 B2
(45) Date of Patent: Nov. 25, 2003

(54) RESONANCE TYPE SWITCHING POWER SUPPLY UNIT

(75) Inventors: Wako Koshita, Miyagi (JP); Katsumi Kobori, Miyagi (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 10/013,370

(22) Filed: Dec. 13, 2001

(65) Prior Publication Data

US 2002/0122317 A1 Sep. 5, 2002

(30) Foreign Application Priority Data

Dec. 22, 2000 (JP) .................... P2000-391186

(51) Int. Cl.[7] ........................... H02M 3/335
(52) U.S. Cl. .................................. 363/21.03
(58) Field of Search .................. 363/21.02, 21.03, 363/21.01; 336/182

(56) References Cited

U.S. PATENT DOCUMENTS 6,100,781 A * 8/2000 Raets et al. ................. 336/180
6,285,567 B1 * 9/2001 Kennedy ................... 363/21.01

FOREIGN PATENT DOCUMENTS

JP           03-022863           1/1991

* cited by examiner

Primary Examiner—Shawn Riley
(74) Attorney, Agent, or Firm—Rader, Fishman & Grauer PLLC; Ronald P. Kananen

(57) ABSTRACT

An object of the present invention is to create the optimum resonating condition to constantly decrease switching losses. A converter transformer capable of varying the leakage inductance is employed as a converter transformer, and a control circuit is arranged to detect an input voltage applied to a switching circuit and a voltage drop brought about in a current detecting resistor which allows a load current to flow. Thus, the leakage inductance of the converter transformer can be controlled.

13 Claims, 8 Drawing Sheets

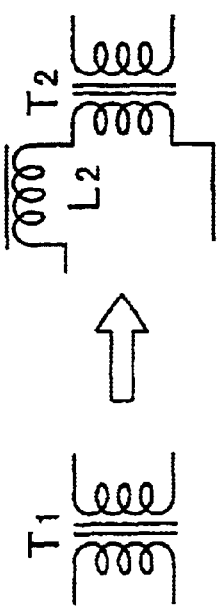
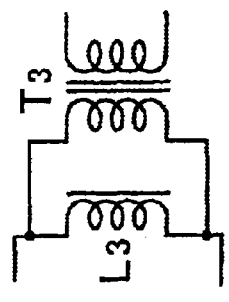
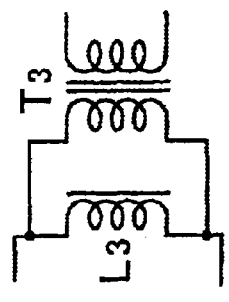
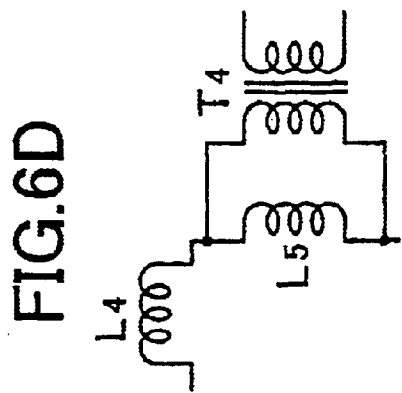
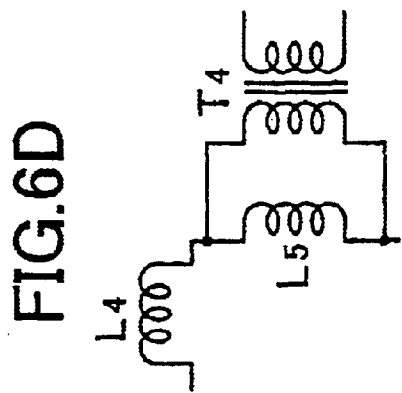
FIG.6A  FIG.6B  FIG.6C  FIG.6D

RESONANCE TYPE SWITCHING POWER SUPPLY UNIT

CROSS REFERENCES TO RELATED APPLICATIONS

The present document is based on Japanese Priority Document JP 2000-391186, filed in the Japanese Patent Office on Dec. 22, 2000, the entire contents of which being incorporated herein by reference.

BACKGROUND OF THE INVENTION

1. Field of the Invention

The present invention relates to a resonance type switching power supply unit having a switching circuit for carrying out a switching operation on an inputted direct current, a converter transformer supplied with a switched output from the switching circuit, a resonator including a coil of the converter transformer as a resonator element, a rectifier for rectifying an output of the converter transformer and supplying the resultant output to a load connected to the resonance type switching power supply unit, and a switching controller for controlling the switching frequency of the switching circuit depending on the rectified output deriving from the rectifier.

2. Description of Related Art

A switching power supply unit has been utilized in a situation in which a commercially available alternative current is rectified and smoothed to create a direct current, and this direct current is subjected to a switching operation at a high frequency, such as 100 kHz, and converted into a current having a desired voltage by a transformer at a high efficiency.

A system for controlling the output voltage in the above-described switching power supply unit may be a pulse width modulation control system in which the duty ratio of the switching pulse is controlled depending on the fluctuation of the output voltage. The system for controlling the output voltage in the above-described switching power supply unit may be a frequency control system or a phase control system of a resonance type in which the frequency or the phase of the switching pulse is controlled. Other variations may be possible for the system for controlling the output voltage in the above-described switching power supply unit.

FIG. 8 is a diagram showing a fundamental circuit configuration of a conventional current resonance type switching power supply unit 200.

As shown in FIG. 8, the current resonance type switching power supply unit 200 is arranged to include an AC rectifying unit 3 connected to a commercially available power supply source 1 through a noise filter 2, a smoothing condenser 4 for smoothing the rectified output generated from the AC rectifying unit 3, a switching circuit 5 for carrying out a switching operation on the direct current that has undergone smoothing by the smoothing condenser 4, and so on. A current resonant circuit 6 composed of a primary coil 10A of a converter transformer 10 and a resonant condenser 6C connected in series is connected to the AC rectifying unit 3 through the switching circuit 5. A secondary coil 10B of the converter transformer 10 is connected to a rectifying/smoothing circuit 20, which is composed of diodes 21A and 21B, condensers 22A and 22B, and a choke coil 23. Further, the rectifying/smoothing circuit 20 is connected with a switching control circuit 25 for controlling the switching operation of the switching circuit through an error detecting circuit 24. The rectifying/smoothing circuit 20 also is connected with output terminals 26A and 26B.

According to the above arrangement of the current resonance type switching power supply unit 200, the secondary side voltage is outputted from the rectifying/smoothing circuit 20 at the output terminals 26A and 26B, and the secondary side voltage is compared with a reference voltage $V_{ref}$ by a voltage comparator 24A in the error detecting circuit 24 to create an error voltage. Then, the resultant error voltage is fed back to the switching control circuit 25 through a photocoupler 24B, whereby switching elements 5A and 5B provided in the switching circuit 5 are switched therebetween at a frequency that is varied depending on the error voltage. Thus, even if the input voltage or the load is fluctuated, a stable voltage can always be obtained.

According to the above-described arrangement of the current resonance type switching power supply unit 200, owing to the resonant circuit formed of the leakage inductance le of the converter transformer 10 and the capacity of the resonant condenser 6C, energy loss can be decreased.

According to the conventional current resonance type switching power supply unit 200, the leakage inductance le of the converter transformer 10 and the capacity of the resonant condenser 6C are fixedly determined. The switching circuit 5 creates the minimum switching loss from the switching elements 5A and 5B at a range near a self-resonance frequency fr, and, consequently, the maximum output voltage can be obtained and the loss ratio becomes the minimum due to the operation characteristic. The operation at this time can be illustrated as shown in FIG. 9. That is, when the condition that the input voltage becomes the minimum and the load current becomes the maximum is satisfied, the switching loss becomes the lowest, with the result that the conversion efficiency becomes the highest.

If either the input voltage or the load is increased, then the switching frequency is increased so that the output voltage becomes constant. The operation at this time can be illustrated as shown in FIG. 10. That is, since the switching element 5A is forcibly turned off to cut the current, which is going to flow at the self-resonance point denoted as $IQ_1$, the turning-off operation at a timing when the current value is large results in an increased switching loss.

When the above power supply unit is utilized in a practical situation, however, the input voltage will vary in a range from 100V to 240V, depending on the region where the unit is driven, with the result that the load current will also vary depending on the operation of an apparatus connected to the power supply unit. Further, in an ordinary case, as the input voltage is increased, and also as the load becomes smaller, the switching frequency is increased so that the power converted into one on the secondary side can be saved and the output becomes stable. Accordingly, when the conventional current resonance type switching power supply unit 200 is operated under an ordinary condition, it is not operated at a region where the loss ratio becomes low.

SUMMARY OF THE INVENTION

The present invention is made in view of the above problem concerning the above-described conventional current resonance type switching power supply unit. That is, according to the present invention, there is provided a novel current resonance type switching power supply unit, which can always convert an inputted power into one having a desired voltage at a high converting efficiency.

According to the present invention, the leakage inductance of the converter transformer is varied in accordance with the fluctuation of the inputted voltage and the load imposed on the power supply unit, whereby an optimum resonating condition can always be created and the switching loss can be constantly suppressed.

According to the present invention, in order to attain the above purpose, there is provided a resonance type switching power supply unit having a switching circuit for carrying out a switching operation on an inputted direct current, a converter transformer supplied with a switched output from the switching circuit, a resonator including a coil of the converter transformer as a resonator element, a rectifier for rectifying an output of the converter transformer and supplying the resultant output to a load connected to the resonance type switching power supply unit, and a switching controller for controlling the switching frequency of the switching circuit depending on the rectified output deriving from the rectifier, wherein the converter transformer is arranged as one capable of varying the leakage inductance thereof, and the resonance type switching power supply unit includes a detector for detecting an input voltage applied to the switching circuit and an output current supplied from the rectifier to the load and a leakage inductance controller for variably controlling the leakage inductance of the converter transformer.

According to the present invention, it becomes possible to vary the leakage inductance of the converter transformer depending on the fluctuation of the inputted voltage and the load imposed on the power supply unit. Therefore, an optimum resonating condition can always be created and the switching loss can be constantly suppressed.

Accordingly, with the above invention, it becomes possible to provide a resonance type switching power supply unit, which can always convert an inputted power into one having a desired voltage at a high converting efficiency.

The above and other objects, features and advantages of the present invention will become apparent from the following description with reference to the accompanying drawings, which illustrate examples of the present invention.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which:

FIGS. 6A, 6B, 6C and 6D are diagrams each schematically showing a structure of the converter transformer that is employed in the current resonance type switching power supply unit and operated in a manner allowable of varying the leakage inductance;

DESCRIPTION OF PREFERRED EMBODIMENTS

Embodiments of the present invention will be hereinafter described in detail with reference to attached drawings.

Figure 1:
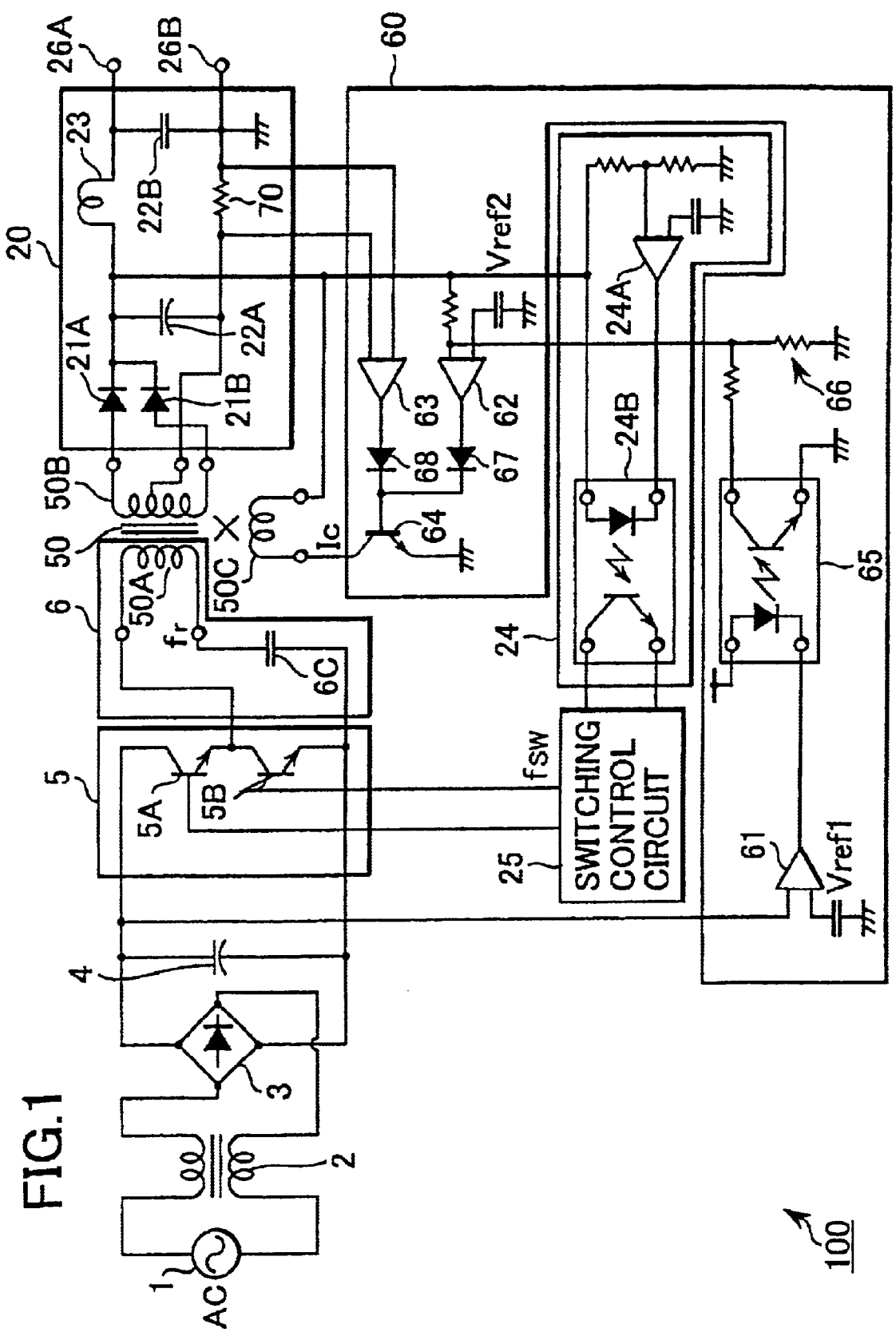
FIG. 1 is a circuit diagram showing an arrangement of a current resonance type switching power supply unit according to the present invention.

The resonance type switching power supply unit according to the present invention is arranged as shown in FIG. 1, for example.

Figure 8:
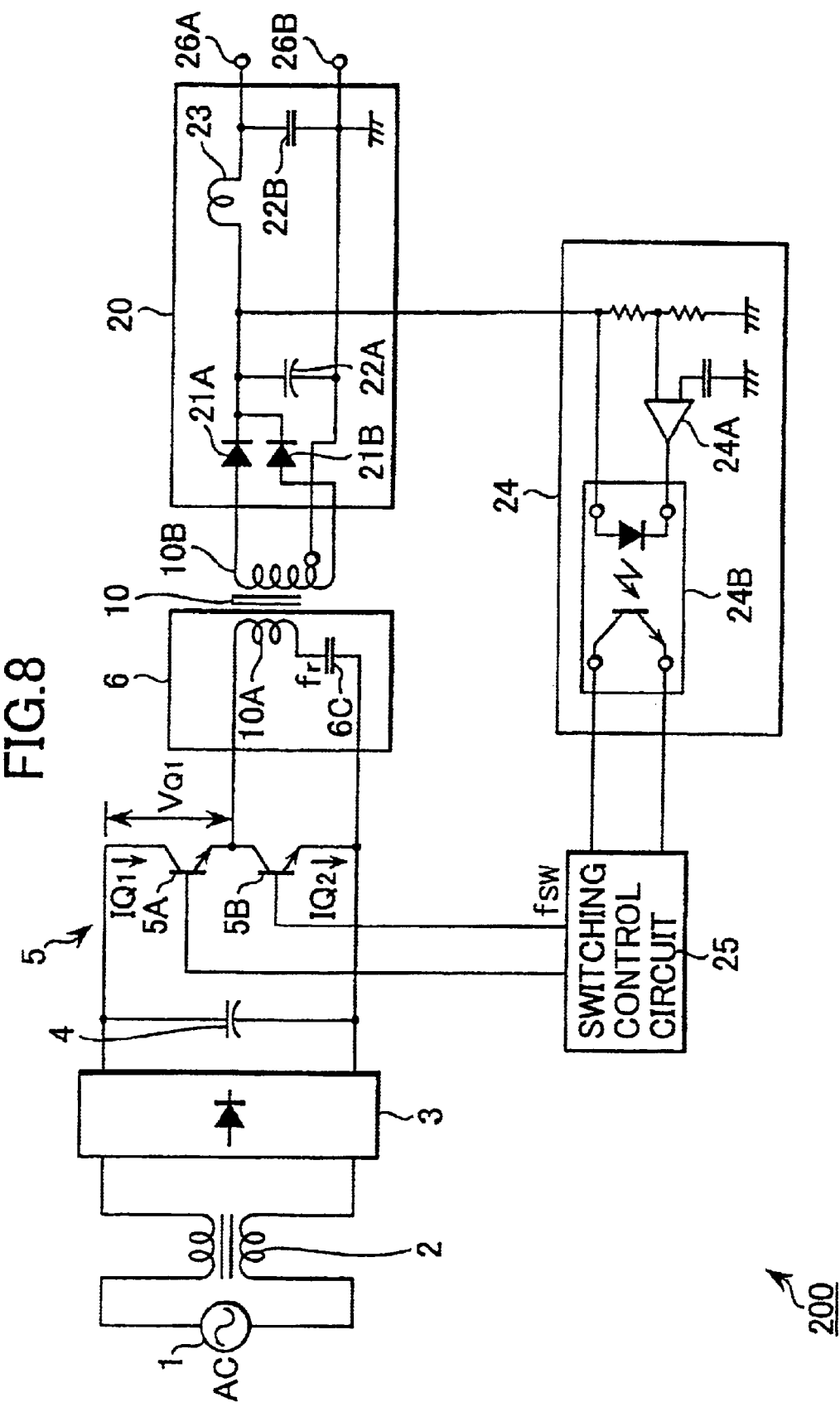
FIG. 8 is a circuit diagram showing a fundamental circuit configuration of a conventional current resonance type switching power supply unit.
Figure 9:
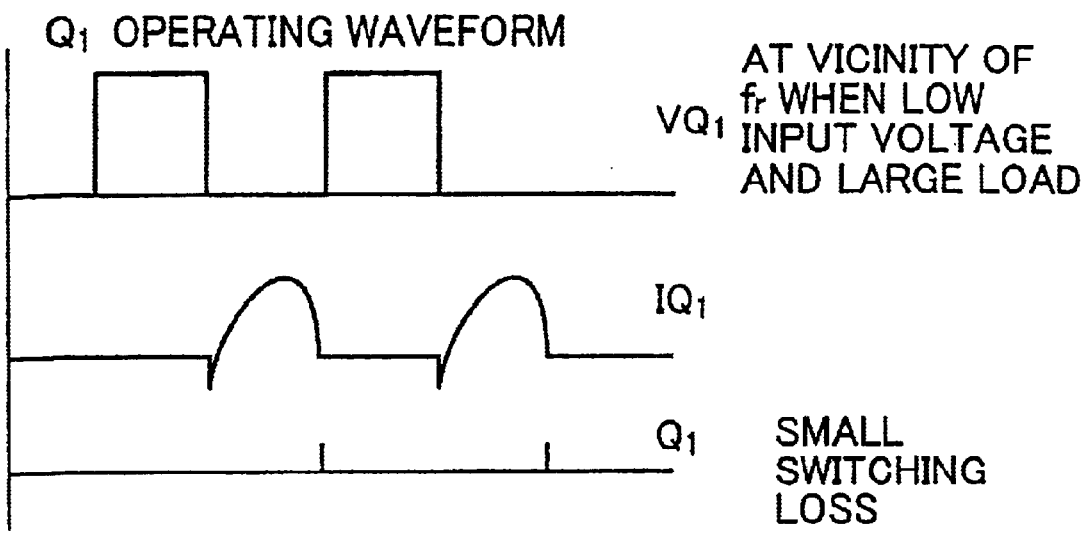
FIG. 9 is a set of waveform diagrams illustrative of an ideal operation condition of the conventional current resonance type switching power supply unit.
Figure 10:
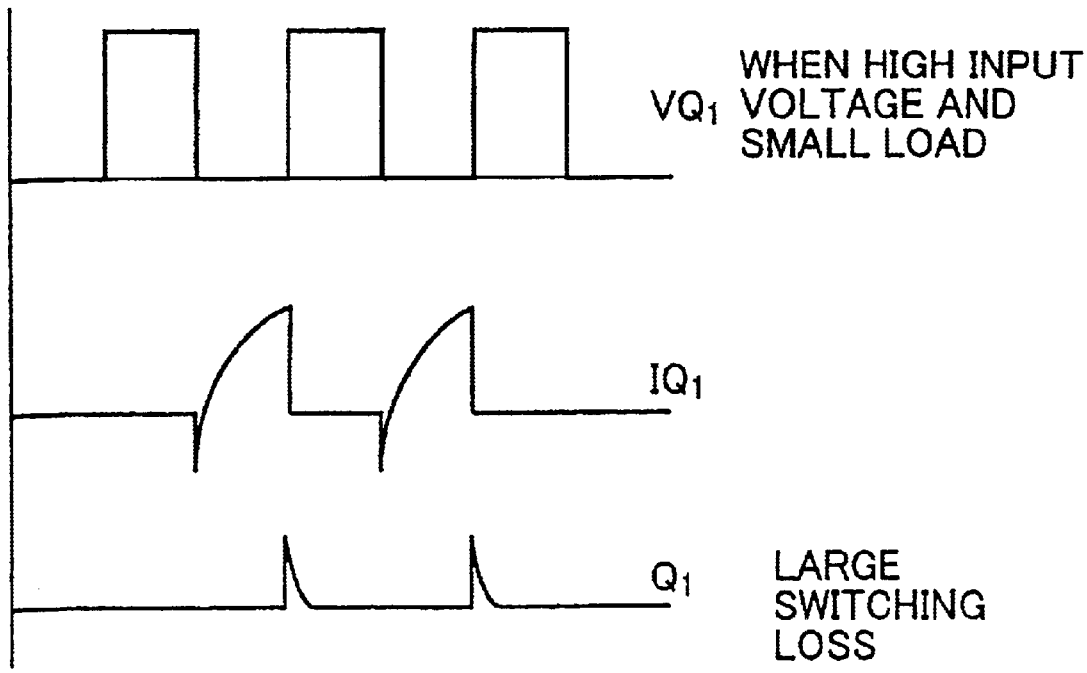
FIG. 10 is a set of waveform diagrams illustrative of an actual operation condition of the conventional current resonance type switching power supply unit.

A current resonance type switching power supply unit 100 shown in FIG. 1 is a unit in which the present invention is applied to the current resonance type switching power supply unit 200 shown in FIG. 8. That is, the converter transformer 10 in which the leakage inductance is fixedly settled is replaced with a converter transformer 50 in which a leakage inductance is variably settled. Also, the current resonance type switching power supply unit 100 is provided with a control circuit 60 for controlling the leakage inductance of the converter transformer 50.

In the current resonance type switching power supply unit 100 shown in FIG. 1, like components corresponding to those constituting the current resonance type switching power supply unit 200 shown in FIG. 8 are identified by the same reference numerals, and they will not be described in detail.

Figure 2A:
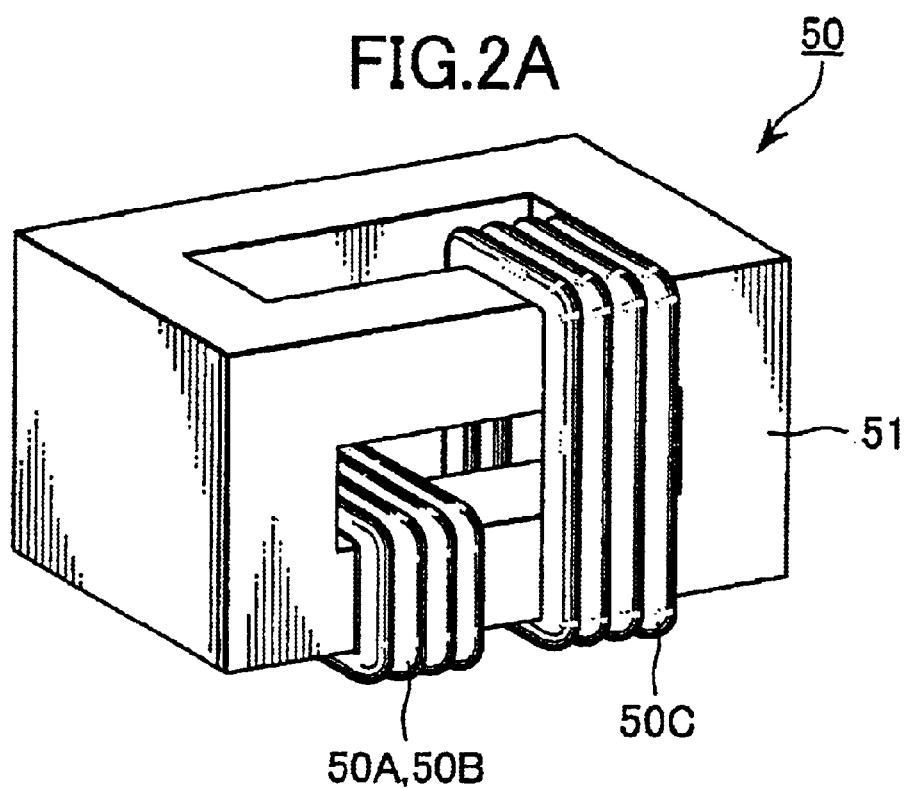
FIGS. 2A and 2B are diagrams each schematically showing a structure of a converter transformer that is employed in the current resonance type switching power supply unit and operated in a manner allowable of varying leakage inductance.
Figure 2B:
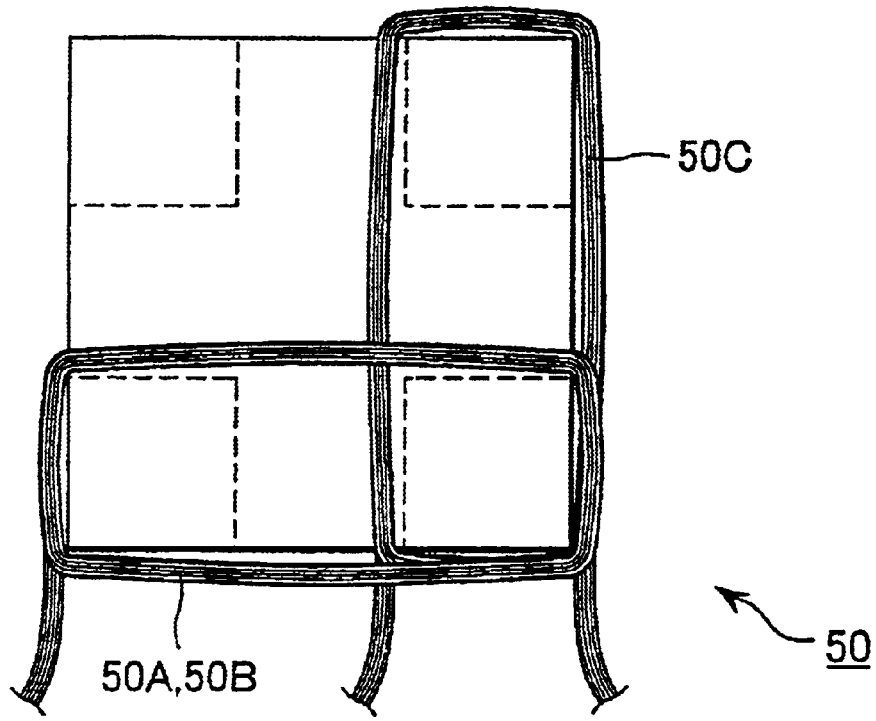

As, for example, shown in FIGS. 2A and 2B, the converter transformer 50 allowable of varying the leakage inductance thereof is configured to have a magnetic core 51 composed of a couple of core members made of a ferrite material having four magnetic legs brought into opposition to each other so that each of the magnetic legs abuts on an opposing one of the legs of the opposing core member. A primary coil 50A and a secondary coil 50B are wound around the magnetic core 51 so that both the coils extend over the common two of the four legs. A control coil 50C is wound around the magnetic core 51 so that the control coil 50C forms a perpendicular posture, that is, being orthogonal, with respect to the primary coil 50A and the secondary coil 50B.

Figure 3:
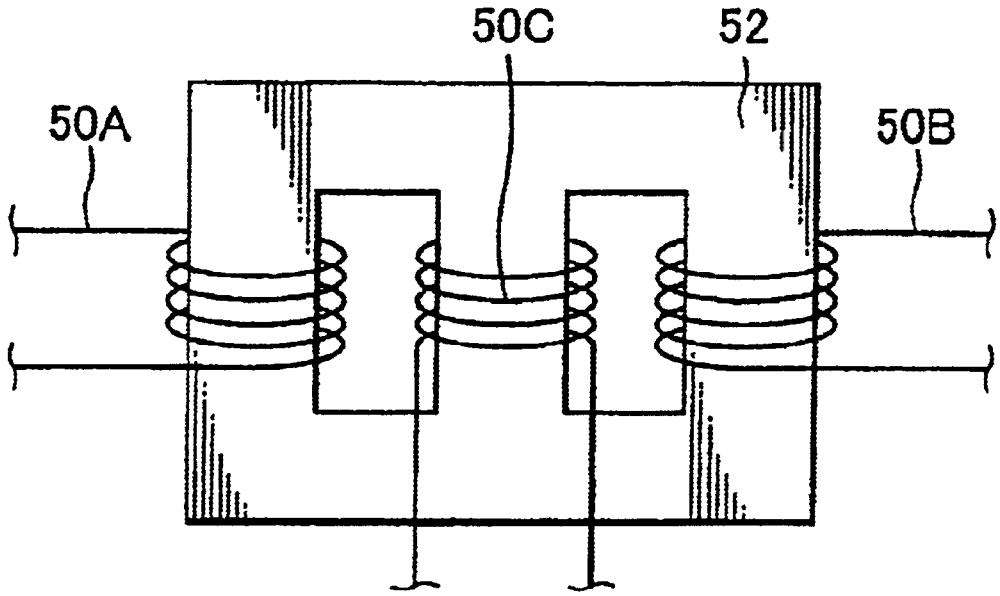
FIG. 3 is a diagram schematically showing another structure of the converter transformer that is employed in the current resonance type switching power supply unit and operated in a manner allowable of varying the leakage inductance.
Figure 3:
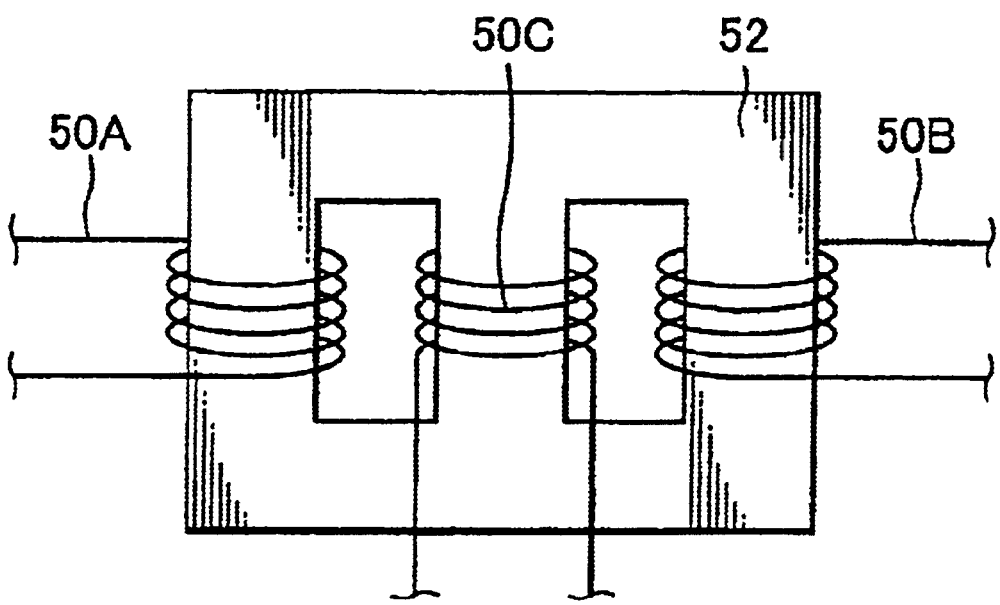

As for the example shown in FIG. 3, the converter transformer 50 may be configured to have a magnetic core 52 composed of a couple of core members made of ferrite material having three magnetic legs forming an E-letter shape brought into opposition to each other so that each of the magnetic legs abuts on opposing one of the legs of the opposing core member. The control coil 50C may be wound around the center magnetic leg, and the primary coil 50A and the secondary coil 50B may be wound around the legs of both sides, respectively.

Figure 4:
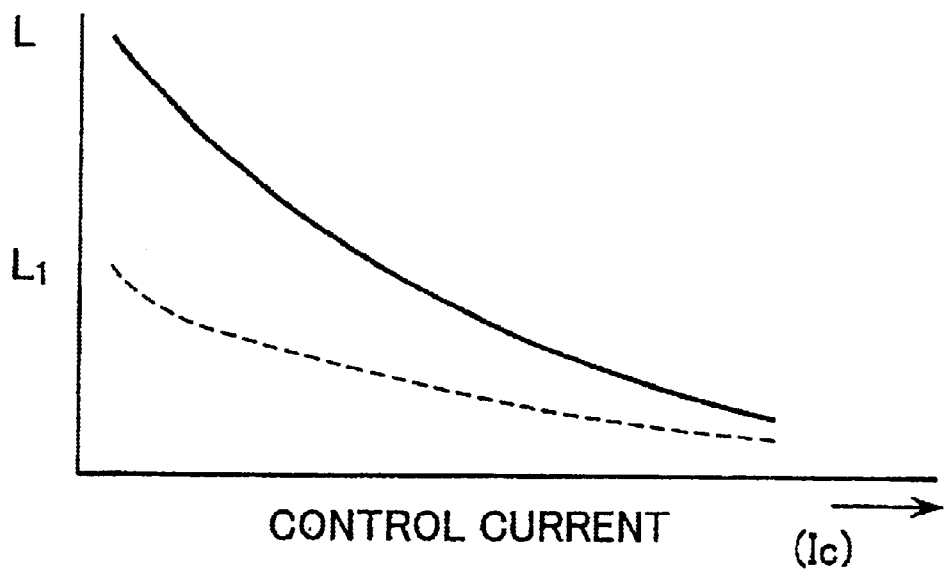
FIG. 4 is a diagram illustrative of a relationship between a control current flowed through a control coil and the leakage inductance of the converter transformer.

In the converter transformer 50 having the above-described structure, when a control current Ic is flowed through the control coil 50C, a part of the core utilized for winding the primary coil 50A and the secondary coil 50B becomes saturated, with the result that, as shown in FIG. 4, the leakage inductance L1 can be changed together with the inductance value L formed in the coil.

In the current resonance type switching power supply unit 100, the secondary coil 50B of the converter transformer 50 is connected at its one end to an output terminal 26B through a current detecting resistor 70.

The control circuit 60 is arranged to include a first voltage comparator 61 for detecting the fluctuation of an input voltage applied to the switching circuit 5, a second voltage comparator 62 for detecting the fluctuation of the rectified output voltage outputted from a rectifying/smoothing circuit 20, a third voltage comparator 63 for detecting a voltage which is proportional to the load current flowing through the current detecting resistor 70 and dropped due to the current detecting resistor 70, and a transistor 64 connected to the control coil 50C coupled to the converter transformer 50.

The first voltage comparator 61 compares the input voltage applied to the switching circuit 5 with a first reference voltage Vref1 to detect a fluctuation of the input voltage and then supplies the detected fluctuation to a resistor adding circuit 66 through a first photocoupler as a first error voltage.

The resistor adding circuit 66 adds the first error voltage to the rectified output voltage outputted from the rectifying/smoothing circuit 20. The second voltage comparator 62 compares the rectified output voltage added with the first error voltage with a second reference voltage Vref2 so as to create voltage fluctuation information corresponding to the fluctuation of the input voltage and the rectified output voltage as the compared output thereof. The compared output of the second voltage comparator 62 is applied to a base of the transistor 64 through a diode 67, whereby the transistor 64 is controlled in such a manner that a control current corresponding to the fluctuation of the input voltage and the rectified output voltage is flowed through the control coil 50C.

The third voltage comparator 63 detects the dropped voltage which is proportional to the load current flowing through the current detecting resistor 70 and dropped due to the current detecting resistor 70. The compared output of the third voltage comparator 63 is applied to the base of the transistor 64, whereby the transistor 64 is controlled in such a manner that a control current in proportion to the load current is flowed through the control coil 50C.

The control circuit 60 detects the input voltage applied to the switching circuit 5 and the dropped voltage which is proportional to the load current flowing through the current detecting resistor 70 and dropped due to the current detecting resistor 70. In accordance with the result of detection, the control circuit 60 controls the converter transformer 50 in the leakage inductance L1 in the following manner.

That is, when the input voltage stays in a low level and the load current is relatively large, the control circuit 60 prohibits the control current Ic from being flowed through the control coil 50C so that the output power can be obtained at the maximum level and the loss ratio stays in the minimum level.

Figure 5:
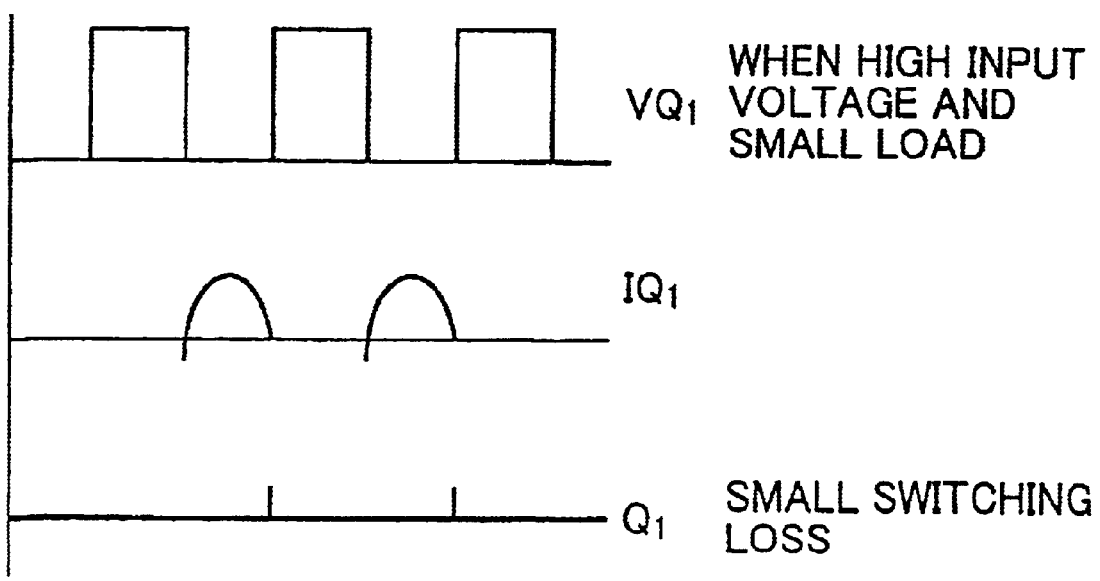
FIG. 5 is a set of waveform diagrams illustrative of the current resonance type switching power supply unit.

If the input voltage is increased and/or the load current is decreased, as shown in FIG. 5, the switching control circuit 25 operates so that a switching frequency fsw is increased to decrease the output voltage. At this time, the control current Ic is flowed through the control coil 50C depending on the degree of increase in the input voltage and/or decrease in the load current. Thus, the leakage inductance L1 of the converter transformer 50 is decreased. Consequently, the control circuit 60 controls the leakage inductance L1 of the converter transformer 50 so that a resonance frequency fr of the current resonant circuit 6 comes into the vicinity of the switching frequency fsw.

As described above, according to the arrangement of the current resonance type switching power supply unit 100, the control current Ic flowed through the control coil 50C is controlled depending on the degree of increase in the input voltage and/or decrease in the load current. Therefore, it becomes possible to suppress the switching loss deriving from the switching element 5A which forcibly turns off to cut the flow of the current $IQ_1$, due to the self-resonance, and consequently a high converting efficiency can be maintained.

While in the above-described embodiment the control circuit 60 is supplied with information indicative of the input voltage applied to the switching circuit 5 and the dropped voltage brought about on the current detecting resistor 70, the oscillating frequency of the switching control circuit 25 may be utilized as information to be supplied to the control circuit 60 to obtain a similar effect.

Although in the above-described embodiment, as the converter transformer 50 capable of varying the leakage inductance L1, there are shown one having an iron core formed to have four magnetic legs and one having an iron core forced to have an E-letter shape with three magnetic legs. However, the converter transformer may be one having a structure in which the control coil is employed for variably changing the inductance of the transformer. Alternatively, the transformer may be one having an arrangement in which the resistor of the magnetic circuit of the transformer is varied by a control signal (e.g., by changing the size of the magnetic gap) so that the leakage inductance is correspondingly varied.

FIG. 6A is a circuit diagram of a fundamental structure of a converter transformer $T_1$. FIGS. 6B, 6C and 6D are diagrams each showing a variation of the structure of the converter transformer shown in FIG. 6A. As shown in FIG. 6B, 6C and 6D, each of transformers $T_2$, $T_3$, and $T_4$ may be coupled to coils $L_2$, $L_3$, and $L_4$ and $L_5$, respectively. Specifically, a coil corresponding to the leakage inductance and the first coil are connected in series on a primary side, as shown in FIG. 6B. Alternatively, the coil and the first coil are connected in parallel on the primary side, as shown in FIG. 6C. Furthermore, the coil is composed of two portions on the primary side, a first portion being connected in parallel with the first coil and a second portion being connected in series with the parallel connection of the first portion and the first coil, as shown in FIG. 6D. In the above arrangements, if the inductance (corresponding to the leakage inductance) of the coils $L_2$, $L_3$, and $L_4$ and $L_5$ coupled to the transformers $T_2$, $T_3$, and $T_4$ are made variable by a control signal, then the converter transformer 50 may be utilized as one capable of varying the leakage inductance. Meanwhile, although in the above example the respective coils $L_2$, $L_3$, and $L_4$ and $L_5$ are provided on the primary side, these coils may be provided on a secondary side.

Figure 7:
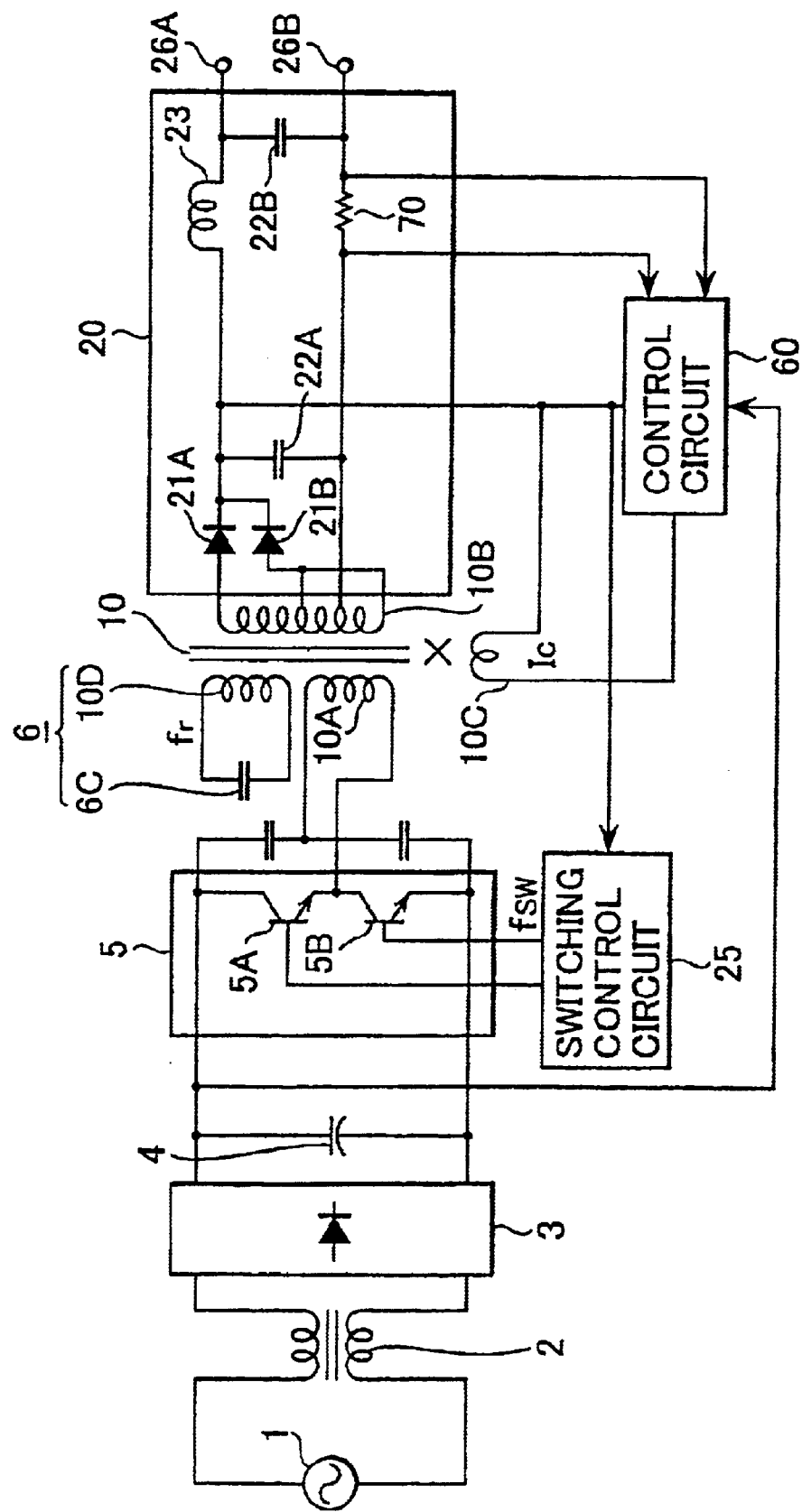
FIG. 7 is a circuit diagram showing an arrangement of a modification of the current resonance type switching power supply unit according to the present invention.

Furthermore, as shown in FIG. 7, the converter transformer may be arranged to include a coil 10D provided independently of the primary coil and the secondary coil of the converter transformer $T_1$, and the current resonant circuit 6 may be made up of the coil 10D and the resonant condenser 6C. In this arrangement, if the inductance of the coil 10D of the current resonant circuit 6 is controlled by the control circuit 60 so that the resonance frequency fr thereof is made coincident with the switching frequency fsw, a high converting efficiency can be also maintained.

What is claimed is:

1. A resonance type switching power supply unit having a switching circuit for carrying out a switching operation on an inputted direct current, a converter transformer supplied with a switched output from the switching circuit, a resonator including a coil of said converter transformer as a resonator element, a rectifier for rectifying an output of said converter transformer and supplying a rectified output to a load connected to said resonance type switching power supply unit, and a switching controller for controlling a switching frequency of said switching circuit depending on the rectified output deriving from said rectifier, said converter transformer being arranged as one capable of varying a leakage inductance thereof, and said resonance type switching power supply unit comprising:

a detector for detecting an input voltage applied to said switching circuit and an output current supplied from said rectifier to the load; and a leakage inductance controller for variably controlling the leakage inductance of said converter transformer.

2. A resonance type switching power supply unit according to claim 1, wherein said converter transformer is arranged to include a magnetic core, a primary coil, a secondary coil, and a control coil coupled to the magnetic core at respective portions of said magnetic core.

3. A resonance type switching power supply unit according to claim 2, wherein said magnetic core is composed of a couple of core members having four magnetic legs brought into opposition to each other so that each of said magnetic legs abuts on an opposing one of the legs of the opposing core member, said primary coil and said secondary coil are wound around said magnetic core so that both of said coils extend over the common two of said four legs, and said control coil is wound around said magnetic core so that said control coil forms a perpendicular posture with respect to said primary coil and said secondary coil.

4. A resonance type switching power supply unit according to claim 3, wherein said magnetic core is made of a ferrite material.

5. A resonance type switching power supply unit according to claim 2, wherein said magnetic core is composed of a couple of core members having three magnetic legs forming an E-letter shape brought into opposition to each other so that each of said magnetic legs abuts on an opposing one of the legs of the opposing core member, said control coil is wound around a center magnetic leg, and said primary coil and said secondary coil are wound around legs of both sides, respectively.

6. A resonance type switching power supply unit according to claim 5, wherein said magnetic core is made of a ferrite material.

7. A resonance type switching power supply unit according to claim 2, wherein a coil corresponding to the leakage inductance and said primary coil are connected in series on a primary side.

8. A resonance type switching power supply unit according to claim 2, wherein a coil corresponding to the leakage inductance and said primary coil are connected in parallel on a primary side.

9. A resonance type switching power supply unit according to claim 2, wherein a coil corresponding to the leakage inductance is composed of two portions on a primary side, a first portion being connected in parallel with said primary coil and a second portion being connected in series with the parallel connection of said first portion and said primary coil.

10. A resonance type switching power supply unit according to claim 2, wherein a coil corresponding to the leakage inductance and said secondary coil are connected in series on a secondary side.

11. A resonance type switching power supply unit according to claim 2, wherein a coil corresponding to the leakage inductance and said secondary coil are connected in parallel on a secondary side.

12. A resonance type switching power supply unit according to claim 2, wherein a coil corresponding to the leakage inductance is composed of two portions on a secondary side, a first portion being connected in parallel with said secondary coil and a second portion being connected in series with the parallel connection of said first portion and said secondary coil.

13. A resonance type switching power supply unit according to claim 1, wherein said converter transformer is arranged to include a third coil provided independently of said primary coil and said secondary coils, and said resonator is made up of a resonant condenser and the third coil.

* * * * *